US008640804B2

(12) United States Patent
Levy et al.

(10) Patent No.: US 8,640,804 B2
(45) Date of Patent: Feb. 4, 2014

(54) VEHICLE FOR TOWING AN AIRPLANE

(75) Inventors: Raphael E. Levy, Petach Tikva (IL);
Ran Braier, Shoham (IL); Arie Perry,
Hod Hasharon (IL)

(73) Assignee: Israel Aerospace Industries Ltd., Lod (IL)

( * ) Notice: Subject to any disclaimer, the term of this patent is extended or adjusted under 35 U.S.C. 154(b) by 0 days.

(21) Appl. No.: 13/702,515

(22) PCT Filed: Jun. 9, 2011

(86) PCT No.: PCT/IL2011/000457
§ 371 (c)(1),
(2), (4) Date: Dec. 6, 2012

(87) PCT Pub. No.: WO2011/154952
PCT Pub. Date: Dec. 15, 2011

(65) Prior Publication Data
US 2013/0081890 A1     Apr. 4, 2013

(30) Foreign Application Priority Data
Jun. 9, 2010   (IL) .......................................... 206262

(51) Int. Cl.
*B60S 9/00*   (2006.01)
(52) U.S. Cl.
USPC ........... 180/204; 180/167; 180/168; 244/189; 244/50
(58) Field of Classification Search
USPC ........ 180/167, 204; 244/50, 51, 53 R, 58, 54, 244/70; 414/426–427
See application file for complete search history.

(56) References Cited

U.S. PATENT DOCUMENTS

| | | |
|---|---|---|
| 2,539,010 A | 1/1951 | Cox |
| 2,957,650 A | 10/1960 | Horan et al. |
| 2,966,222 A | 12/1960 | Lambert, Jr. |
| 3,064,746 A | 11/1962 | Williamson |
| 3,279,722 A | 10/1966 | Glover, Jr. et al. |
| 4,007,890 A | 2/1977 | Bremer et al. |
| 4,036,384 A | 7/1977 | Johnson |
| 4,113,041 A | 9/1978 | Birkholm |
| 4,122,960 A | 10/1978 | Bauer et al. |

(Continued)

FOREIGN PATENT DOCUMENTS

| | | |
|---|---|---|
| DE | 3327628 | 2/1985 |
| DE | 3327629 | 2/1985 |

(Continued)

OTHER PUBLICATIONS

International Search Report and Written Opinion from International Application No. PCT/IL2007/001172 mailed May 14, 2008.

(Continued)

*Primary Examiner* — John Walters
*Assistant Examiner* — James Triggs
(74) *Attorney, Agent, or Firm* — Dorsey & Whitney LLP

(57) ABSTRACT

A vehicle for towing an airplane by receiving thereupon a nose landing gear of the airplane having an airplane longitudinal axis. The vehicle having a vehicle longitudinal axis and is configured to tow the airplane along a straight or curved path and comprises a controller for directing its operation, including maintaining the vehicle's in-phase position in which the vehicle longitudinal axis is parallel to the airplane longitudinal axis.

20 Claims, 4 Drawing Sheets

(56) References Cited

U.S. PATENT DOCUMENTS

| | | | |
|---|---|---|---|
| 4,225,279 A | 9/1980 | Boyer | |
| 4,237,994 A | 12/1980 | McColl | |
| 4,375,244 A | 3/1983 | Morin | |
| 4,482,961 A | 11/1984 | Kilner et al. | |
| 4,632,625 A | 12/1986 | Schuller et al. | |
| 4,658,924 A | 4/1987 | Dobbie | |
| 4,730,685 A | 3/1988 | Sinkkonen | |
| 4,745,410 A | 5/1988 | Schuller et al. | |
| 4,810,157 A | 3/1989 | Schopf | |
| 4,836,734 A | 6/1989 | Pollner et al. | |
| 4,842,220 A | 6/1989 | Versteeg | |
| 4,911,603 A | 3/1990 | Pollner et al. | |
| 4,911,604 A | 3/1990 | Pollner et al. | |
| 4,913,253 A | 4/1990 | Bowling | |
| 4,913,375 A * | 4/1990 | Fitzpatrick | 244/2 |
| 4,917,563 A | 4/1990 | Pollner et al. | |
| 4,917,564 A | 4/1990 | Pollner et al. | |
| 4,923,253 A | 5/1990 | Pollner et al. | |
| 4,950,121 A | 8/1990 | Meyer et al. | |
| 4,976,499 A | 12/1990 | Guichard et al. | |
| 4,994,681 A | 2/1991 | Mann | |
| 4,997,331 A | 3/1991 | Grinsted et al. | |
| 5,013,205 A | 5/1991 | Schardt | |
| 5,048,625 A | 9/1991 | Birkeholm | |
| 5,051,052 A | 9/1991 | Fraken et al. | |
| 5,054,714 A | 10/1991 | Franken et al. | |
| 5,078,340 A | 1/1992 | Anderberg | |
| 5,082,082 A | 1/1992 | Hvolka | |
| 5,110,067 A | 5/1992 | Sinkkonen | |
| 5,151,003 A | 9/1992 | Zschoche | |
| 5,176,341 A | 1/1993 | Ishikawa et al. | |
| 5,202,075 A | 4/1993 | Barnard et al. | |
| 5,219,033 A | 6/1993 | Pollner et al. | |
| 5,259,572 A | 11/1993 | Franken et al. | |
| 5,261,778 A | 11/1993 | Zschoche | |
| 5,302,074 A | 4/1994 | Elfstrom | |
| 5,302,075 A | 4/1994 | Zschoche | |
| 5,302,076 A | 4/1994 | Bammel et al. | |
| 5,308,212 A | 5/1994 | Pollner et al. | |
| 5,314,287 A | 5/1994 | Wichert | |
| 5,346,354 A | 9/1994 | Hellstrom | |
| 5,381,987 A | 1/1995 | Carns | |
| 5,480,274 A | 1/1996 | Franken et al. | |
| 5,511,926 A | 4/1996 | Iles | |
| 5,516,252 A * | 5/1996 | Francke et al. | 414/426 |
| 5,549,436 A | 8/1996 | Fresia | |
| 5,562,388 A * | 10/1996 | Le Gall et al. | 414/427 |
| 5,655,733 A | 8/1997 | Roach | |
| 5,680,125 A * | 10/1997 | Elfstrom et al. | 340/958 |
| 5,860,785 A | 1/1999 | Eberspacher | |
| 6,209,671 B1 | 4/2001 | Klein et al. | |
| 6,283,696 B1 | 9/2001 | Trummer et al. | |
| 6,301,529 B1 | 10/2001 | Itoyama et al. | |
| 6,305,484 B1 * | 10/2001 | Leblanc | 180/167 |
| 6,352,130 B2 | 3/2002 | Klein et al. | |
| 6,352,318 B1 | 3/2002 | Hosomi et al. | |
| 6,357,989 B1 | 3/2002 | Iles | |
| 6,390,762 B1 | 5/2002 | Peery et al. | |
| 6,405,975 B1 | 6/2002 | Sankrithi et al. | |
| 6,446,998 B1 * | 9/2002 | Koenig et al. | 280/432 |
| 6,543,790 B2 | 4/2003 | Johnson | |
| 6,600,992 B2 | 7/2003 | Dow | |
| 6,675,920 B1 | 1/2004 | Diez et al. | |
| 6,739,822 B2 * | 5/2004 | Johansson | 414/427 |
| 6,751,588 B1 | 6/2004 | Menendez-Pidal et al. | |
| 6,923,281 B2 | 8/2005 | Chernoff et al. | |
| 6,945,254 B2 * | 9/2005 | Schonert et al. | 132/202 |
| 6,945,354 B2 | 9/2005 | Goff | |
| 7,975,959 B2 * | 7/2011 | Perry et al. | 244/50 |
| 8,094,042 B2 * | 1/2012 | Read et al. | 340/960 |
| 8,245,980 B2 * | 8/2012 | Perry et al. | 244/189 |
| 2002/0173904 A1 | 11/2002 | Dow | |
| 2003/0047362 A1 | 3/2003 | Chernoff et al. | |
| 2003/0095854 A1 | 5/2003 | Abela | |
| 2005/0196256 A1 | 9/2005 | Rodenkirch et al. | |
| 2006/0056949 A1 * | 3/2006 | Eckert | 414/427 |
| 2006/0278756 A1 | 12/2006 | Marshall | |
| 2008/0083851 A1 | 4/2008 | Perry et al. | |
| 2008/0099600 A1 * | 5/2008 | Perry et al. | 244/70 |
| 2009/0183499 A1 | 7/2009 | Boorse | |
| 2011/0127366 A1 | 6/2011 | Becker | |

FOREIGN PATENT DOCUMENTS

| | | |
|---|---|---|
| DE | 3521429 | 12/1986 |
| DE | 3534045 | 4/1987 |
| DE | 3928854 | 3/1991 |
| DE | 4007610 | 9/1991 |
| DE | 4009419 | 9/1991 |
| DE | 4102861 | 8/1992 |
| DE | 4131649 | 3/1993 |
| DE | 4324211 | 1/1995 |
| DE | 4340919 | 3/1995 |
| DE | 4446047 | 7/1996 |
| DE | 4446048 | 7/1996 |
| DE | 3844744 | 5/1997 |
| DE | 19734238 | 2/1998 |
| EP | 0235845 | 9/1987 |
| EP | 0649787 | 4/1995 |
| EP | 1190947 | 3/2002 |
| EP | 1623924 | 2/2006 |
| EP | 1634808 | 3/2006 |
| FR | 2581965 | 11/1986 |
| FR | 2675919 | 10/1992 |
| FR | 2911658 | 7/2008 |
| GB | 1249465 | 10/1971 |
| JP | S56002237 | 1/1981 |
| JP | S57070741 | 5/1982 |
| JP | H2279497 | 11/1990 |
| JP | H04138997 | 5/1992 |
| JP | 2003189412 | 7/2003 |
| RU | 2271316 | 3/2006 |
| RU | 2302980 | 7/2007 |
| WO | WO 8500790 | 2/1985 |
| WO | WO 8903343 | 4/1989 |
| WO | WO 9011932 | 10/1990 |
| WO | WO 9313985 | 7/1993 |
| WO | WO 9852822 | 11/1998 |
| WO | WO 2004028903 | 4/2004 |
| WO | WO 2004114252 | 12/2004 |
| WO | WO 2008038270 | 4/2008 |
| WO | WO 2010012261 | 2/2010 |

OTHER PUBLICATIONS

International Search Report and Written Opinion from International Application No. PCT/IL2009/001110 mailed Oct. 26, 2010.
International Search Report and Written Opinion from International Application No. PCT/IL2008/000459 mailed Nov. 6, 2008.
International Search Report from International Application No. PCT/IL2011/000416 mailed Oct. 17, 2011.
International Search Report from International Application No. PCT/IL2011/050626 mailed Jul. 1, 2011.
International Search Report and Written Opinion from International Application No. PCT/IL2008/000036 mailed Oct. 14, 2008.
International Search Report from International Application No. PCT/IL2012/050357 mailed Mar. 11, 2013.

* cited by examiner

VEHICLE FOR TOWING AN AIRPLANE

FIELD OF THE PRESENTLY DISCLOSED SUBJECT MATTER

This invention relates to towing vehicles for airplanes, and in particular to steering systems thereof.

BACKGROUND

In modern airports the terminal is located relatively far from the runaways. Airplanes use their jet engines to travel from the terminal to a runaway (said operation is also known as taxi-out) and to travel from a runway to the terminal (said operation is also known as taxi-in).

These jet engines are very noisy, cause safety hazards, burn large quantities of fuel and cause to significant air pollution, the emission of large quantities of noxious $CO_2$ gas. The steady rise in fuel prices and the concerns of noise and gas pollution forced the aerospace industry to search for alternative means to taxi airplanes with engines stopped, which are called dispatch or operational towing.

In order to reduce the usage of jet engines and thus save fuel and $CO_2$ emission, various airplane towing systems were provided. Some are illustrated in the following patents and patent applications, all being incorporated herein by reference: U.S. Pat. No. 6,305,484 of Leblanc; U.S. Pat. No. 5,219,033 of Pollner et al.; U.S. Pat. No. 5,314,287 of Wichert; U.S. Pat. No. 5,860,785 of Eberspacher; U.S. Pat. No. 6,283,696 of Trummer et al.; U.S. Pat. No. 6,352,130 of Klein et al.; U.S. Pat. No. 6,543,790 of Johnson; U.S. Pat. No. 6,675,920 of Diez et al.; U.S. Patent application publication serial number 2006/0056949 of Eckert; U.S. Patent application publication serial number 2003/095854 of Abela; U.S. Patent application publication serial number 2005/196256 of Rodenkirch et al.; European patent application 649787A1 of Michelson et al and PCT patent application publication serial number WO/04028903A1 of Maggiori. There is a need to provide a method and system for transferring an airplane, particularly by towing it and controlling it, steering and braking, from the cockpit during this process.

SUMMARY

The presently disclosed subject matter, in its one aspect, provides a vehicle for towing an airplane by receiving thereupon a nose landing gear of the airplane having an airplane longitudinal axis. The vehicle having a vehicle longitudinal axis and being configured to tow the airplane along a straight or curved path and comprising a controller for directing its operation, including maintaining the vehicle's in-phase position in which the vehicle longitudinal axis is parallel to the airplane longitudinal axis.

The airplane which is configured to be towed by the vehicle is configured for turning about an airplane pivot point which lies on an axis of its main landing gear wheels. The vehicle comprises a plurality of wheels each configured for rolling about an axis of rotation. The controller is configured to direct all wheels, during turning of the vehicle, to maintain their axes of rotation so as to intersect at the airplane pivot point.

The airplane is configured to receive from its operator a steering command resulting in turning at least one front airplane wheel of the nose landing gear relative to the airplane longitudinal axis. The controller can receive a first signal indicative of indicative of an angle to which the at least one front airplane wheel is turned relative to the airplane longitudinal axis, for calculating the location of the airplane pivot point, and a second signal indicative of an angle between the vehicle and the airplane longitudinal axes. The controller can also direct operation of the vehicle so as to turn the vehicle about the airplane pivot point, thereby causing the vehicle be in the in-phase position with the airplane.

The nose landing gear of the airplane can have at least one front airplane wheel having a first axis of rotation, the airplane having main landing gear wheels with a common second axis of rotation such that, the first and the second axes of rotation intersect in a common airplane pivot point about which the airplane is to turn. The vehicle can have a plurality of vehicle wheels, each having a vehicle wheel axis of rotation. The controller can calculate the location of the pivot point of the airplane according to a steering angle between the first and the second axes of rotation, and to control each vehicle wheel to be turned at its Ackerman angle, being calculated by the controller according to the steering angle, with respect to the second axis of rotation such that all vehicle wheel axes intersect at the pivot point, whereby the in-phase position is maintained.

The controller can receive a signal indicative of an out-phase position of the vehicle relative to the airplane, in which there is deviation from the parallel disposition of the vehicle longitudinal axis with respect to the airplane longitudinal axis, and to correct, in response to the signal, the deviation by turning at least part of the vehicle wheels so as to return the vehicle to the in-phase position.

The controller can be configured to operate all the vehicle wheels such that their wheel axes intersect at an intermediate point which is different from the pivot point, and, only when the deviation disappears, and to turn all the vehicle wheels to their Ackerman angles for maintaining the in-phase position of the vehicle.

According to one case, in which the deviation from the parallel disposition of the vehicle longitudinal axis relative to the airplane longitudinal axis is such that the vehicle longitudinal axis is diverted towards the pivot point, the intermediate point being located farther from the airplane longitudinal axis than the pivot point.

According to another case, in which the deviation from the parallel disposition of the vehicle longitudinal axis relative to the airplane longitudinal axis is such that the vehicle longitudinal axis is diverted away from the pivot point, the intermediate point is located closer to the airplane longitudinal axis than the pivot point.

The vehicle wheels can comprise front and rear wheels, and the controller can be configured to operate the front wheels to be turned in one direction from their Ackerman angle, and to operate the rear wheels to be turned in another, opposite direction from their Ackerman angle, to yaw the vehicle until brought to the in-phase position with the airplane.

According to one case, in which the deviation from the parallel disposition of the vehicle longitudinal axis relative to the airplane longitudinal axis is such that the vehicle longitudinal axis is diverted away from the pivot point, the controller is configured to correct the deviation by turning the front wheels towards the airplane longitudinal axis, and by turning the rear wheels away from the airplane longitudinal axis. The turning of the front wheels towards the airplane longitudinal axis can be provided such that the angle between the axis of each front wheel and the second axis of rotation is a sum of the Ackerman angle of each wheel and a correction angle, and the turning of the rear wheels away from the airplane longitudinal axis is provided such that the angle between the axis of each rear wheel and the second axis of rotation is a subtraction of a correction angle which is multiplied by a wheel base ration λ from the Ackerman angle of each wheel, when λ is associated with the location of the nose landing gear on the vehicle and the distance of the vehicle wheels therefrom.

According to another case, in which the deviation from the parallel disposition of the vehicle longitudinal axis relative to that of the airplane is such that the vehicle longitudinal axis is diverted towards the pivot point, the controller is configured to correct the deviation by turning the front wheels away from the airplane longitudinal axis, and by turning the rear wheels towards the airplane longitudinal axis. The turning of the front wheels away from the airplane longitudinal axis can be provided such that the angle between the axis of each front wheel and the second axis of rotation is a subtraction of a correction angle from the Ackerman angle of each wheel, and the turning of the rear wheels towards the airplane longitudinal axis is provided such that the angle between the axis of each rear wheel and the second axis of rotation is a sum of the Ackerman angle of each wheel and a correction angle which is multiplied by a wheel base ration λ that is associated with the location of the nose landing gear on the vehicle.

The correction angle can proportional to a deviation angle formed between the vehicle longitudinal axis and the airplane longitudinal axis, and the proportion between the correction angle and the deviation angle can be associated with the speed at which the deviation is to be corrected.

The vehicle can further comprise a sensor configured for sensing at least indirectly the steering angle which is associated with the angle between the at least one front wheel of the airplane and the airplane longitudinal axis, and generating the signal to the controller.

The vehicle can further comprises a sensor configured for sensing at least indirectly a deviation angle formed between the vehicle longitudinal axis and the airplane longitudinal axis, and generating a signal to the controller indicative of the deviation angle.

The turning of the wheels front and the rear wheels to different direction can be configured to cause the vehicle to perform yawing of with respect to a longitudinal axis of the nose landing gear being received upon the vehicle.

According to a still further aspect of the presently disclosed subject matter, there is provided a method for directing operation of a vehicle configured to tow an airplane by receiving thereupon a nose landing gear of the airplane having an airplane longitudinal axis, the vehicle having a vehicle longitudinal axis and being configured to tow the airplane along a straight or curved path and comprising a controller, the method comprising steps of: directing the operation of the vehicle; and maintaining the vehicle's in-phase position in which the vehicle longitudinal axis is parallel to the airplane longitudinal axis.

The vehicle, according to this method, can comprise a controller and a plurality of wheels each configured for rolling about an axis of rotation, the method further comprising steps of:
   turning the airplane about an airplane pivot point which lies on an axis of its main landing gear wheels;
   turning the vehicle; and
   directing, via the controller, all the wheels of the vehicle, during turning of the vehicle, to maintain their axes of rotation so as to intersect at the airplane pivot point.

The method can further comprise steps of receiving, by the controller, a first signal indicative of an angle between at least one front airplane wheel of the nose landing gear and the airplane longitudinal axis, indicative of a steering command of the airplane for calculating the location of the airplane pivot point, and a second signal indicative of an angle between the vehicle and airplane longitudinal axes and directing, via the controller, the operation of the vehicle so as to turn about the airplane pivot point, thereby causing the vehicle be in the in-phase position with the airplane.

The nose landing gear of the airplane can have at least one front airplane wheel having a first axis of rotation, the airplane having main landing gear wheels with a common second axis of rotation such that, the first and the second axes of rotation intersect in a common airplane pivot point about which the airplane is to turn; and wherein the vehicle comprises a plurality of vehicle wheels, each having a vehicle wheel axis of rotation; the method further comprising step of calculating, via the controller, the location of the pivot point of the airplane according to a steering angle between the first and the second axes of rotation, and controlling, each vehicle wheel to be turned at its Ackerman angle, being calculated by the controller according to the steering angle, with respect to the second axis of rotation such that all vehicle wheel axes intersect at the pivot point, thereby maintain the in-phase position of the vehicle.

The method can further comprise steps of: receiving, by the controller, signal indicative of an out-phase position of the vehicle relative to the airplane, in which there is deviation from the parallel disposition of the vehicle longitudinal axis with respect to the airplane longitudinal axis, and correcting, by the controller, in response to the signal, the deviation by turning at least part of the vehicle wheels so as to return the vehicle to the in-phase position.

The method can further comprise steps of operating all the vehicle wheels to be turned such that their wheel axes intersect at an intermediate point which is different from the pivot point, and, only when the deviation disappears, turning all the vehicle wheels to their Ackerman angles for maintaining the in-phase position of the vehicle.

According to one case, in which the deviation from the parallel disposition of the vehicle longitudinal axis relative to the airplane longitudinal axis is such that the vehicle longitudinal axis is diverted towards the pivot point, the intermediate point being located farther from the airplane longitudinal axis than the pivot point.

According to another case, in which the deviation from the parallel disposition of the vehicle longitudinal axis relative to the airplane longitudinal axis is such that the vehicle longitudinal axis is diverted away from the pivot point, the intermediate point is located closer to the airplane longitudinal axis than the pivot point.

The vehicle wheels can comprise front and rear wheels; and the method can further comprise steps of operating, by the controller, the front wheels to be turned in one direction from their Ackerman angle, and operating the rear wheels to be turned in another, opposite direction from their Ackerman angle, thereby yawing the vehicle until brought to the in-phase position with the airplane.

According to one case, in which the deviation from the parallel disposition of the vehicle longitudinal axis relative to the airplane longitudinal axis is such that the vehicle longitudinal axis is diverted away from the pivot point; the method further comprising step of correcting, by the controller, the deviation by turning the front wheels towards the airplane longitudinal axis, and by turning the rear wheels away from the airplane longitudinal axis. The turning of the front wheels towards the airplane longitudinal axis is provided such that the angle between the axis of each front wheel and the second axis of rotation is a sum of the Ackerman angle of each wheel and a correction angle; and wherein the turning of the rear wheels away from the airplane longitudinal axis is provided such that the angle between the axis of each rear wheel and the second axis of rotation is a subtraction of a correction angle which is multiplied by a wheel base ration λ from the Ackerman angle of each wheel, when λ is associated with the location of the nose landing gear on the vehicle and the distance of the vehicle wheels therefrom.

According to another case, in which the deviation from the parallel disposition of the vehicle longitudinal axis relative to that of the airplane is such that the vehicle longitudinal axis is diverted towards the pivot point; the method further comprising step of correcting, by the controller, the deviation by turning the front wheels away from the airplane longitudinal axis, and by turning the rear wheels towards the airplane longitudinal axis. The turning of the front wheels away from the airplane longitudinal axis can be provided such that the angle between the axis of each front wheel and the second axis of rotation is a subtraction of a correction angle from the Ackerman angle of each wheel; and wherein the turning of the rear wheels towards the airplane longitudinal axis is provided such that the angle between the axis of each rear wheel and the second axis of rotation is a sum of the Ackerman angle of each wheel and a correction angle which is multiplied by a wheel base ration λ that is associated with the location of the nose landing gear on the vehicle.

The correction angle can be proportional to a deviation angle formed between the vehicle longitudinal axis and the airplane longitudinal axis, and the proportion between the angle of correction and the angle of deviation is associated with the speed in which the deviation is corrected.

The method can further comprise step of sensing by a sensor of the vehicle, at least indirectly the steering angle which is associated with the angle between the at least one front wheel of the airplane and the airplane longitudinal axis, and generating the signal to the controller.

The method can further comprise step of sensing by a sensor of the vehicle, at least indirectly a deviation angle formed between the vehicle longitudinal axis and the airplane longitudinal axis, and generating a signal to the controller indicative of the deviation angle.

The turning of the wheels front and the rear wheels to different directions with respect to their Ackerman angles can be configured to cause the vehicle to perform yawing with respect to a longitudinal axis of the nose landing gear being received upon the vehicle.

According to a still further aspect of the presently disclosed subject matter, there is provided a system including an airplane having a longitudinal axis and a vehicle, for towing the airplane.

BRIEF DESCRIPTION OF THE DRAWINGS

In order to understand the invention and to see how it may be carried out in practice, an embodiment will now be described, by way of a non-limiting example only, with reference to the accompanying drawings, in which.

DETAILED DESCRIPTION OF DRAWINGS

Figure 1:
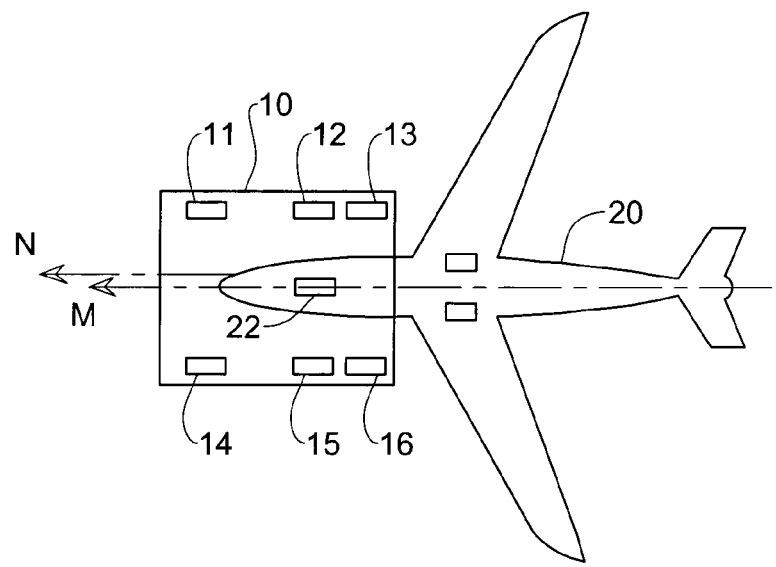
FIG. 1 is a schematic illustration of a vehicle and airplane when the airplane is town by the vehicle along a straight path.

As illustrated in FIG. 1, there is provided a vehicle 10 configured for towing an airplane 20 having a longitudinal axis M, along a curved or a straight path, by receiving thereupon a nose landing gear (not shown) of the airplane 20. The vehicle 10 comprises six wheels 11, 12, 13, 14, 15, and 16, and has an associated vehicle longitudinal axis N. The wheels 11-16 can be independently steerable, and independently drivable. This means that each wheel may be steered at its own angle with respected to the vehicle longitudinal axis N, and also rotated (for driving the vehicle) at its own speed. The vehicle 10 comprises a controller (not shown) configured to direct the operation of the vehicle 10, and particularly its steering. For example, the controller can receive the desired angle at which the airplane 10 should be rotated (the angle can be received according to a steering command provided by the pilot of the airplane which uses the tiller of the airplane for steering the nose landing gear), and operate its wheels 11-16 accordingly (e.g., by turning them at a predetermined angle with respect to the vehicle longitudinal axis N). As part of the controller's operation, it is responsible for maintaining the vehicle 10 in an in-phase position with the airplane 20, while the vehicle longitudinal axis N is parallel to the airplane longitudinal axis M all the time, both during straight motion thereof, as well as during turns. In this position, the vehicle 10 and the airplane 20 are in-line with each other, and the airplane 20 is towed by the vehicle 10 at the same path as it would have been transported when using its own wheels (without the vehicle 10).

The term 'in-phase position' refers hereinafter to a position in which the wheels of the vehicle 10 have to be steered such that, during turns of, the pivoting points of the vehicle 10 and the airplane 20 are identical, and the desired steering of the airplane (e.g., by a pilot) is achieved. The desired steering can be, for example, a steering in which the airplane turns at an angle at which the pilot wants and commands it to turn.

The term 'out-phase position' refers hereinafter to a position which is different from the 'in-phase position', such that the pivoting points of the vehicle 10 and the airplane 20, during turning thereof, are different.

The term 'out-phase steering' refers hereinafter to a mode of steering which is provided by the vehicle. In this mode, the wheels of the vehicle 10 are steered so as to correct a situation in which the longitudinal axis of an airplane is not parallel to the longitudinal axis of its towing vehicle (i.e., the vehicle and to airplane are not in-line with each other). The out-phase steering is performed in order to return the vehicle and the airplane to the in-phase steering, and to provide the desired steering of the airplane (e.g., by a pilot).

It will be appreciated that all references to axes or directions of axles herein the specification and claims implicitly refer to their perpendicular projection on the ground. Thus, two axes which are described as being, "parallel", or "intersecting" with one another may in fact be separated from one another, while their perpendicular projections on the ground are parallel, or intersecting.

FIG. 1 shows one example, in which the airplane 20 is steered by the pilot to be town by the vehicle 10 along a straight path. According to this example, front airplane wheels 22 of the nose landing gear are parallel to the airplane longitudinal axis M, and the controller directs the wheels 11-16 of the vehicle 10 to be also parallel to the vehicle longitudinal axis N (as shown in FIG. 1), so as to provide movement of the airplane 20 together with the vehicle 10 along a straight path.

Figure 2:
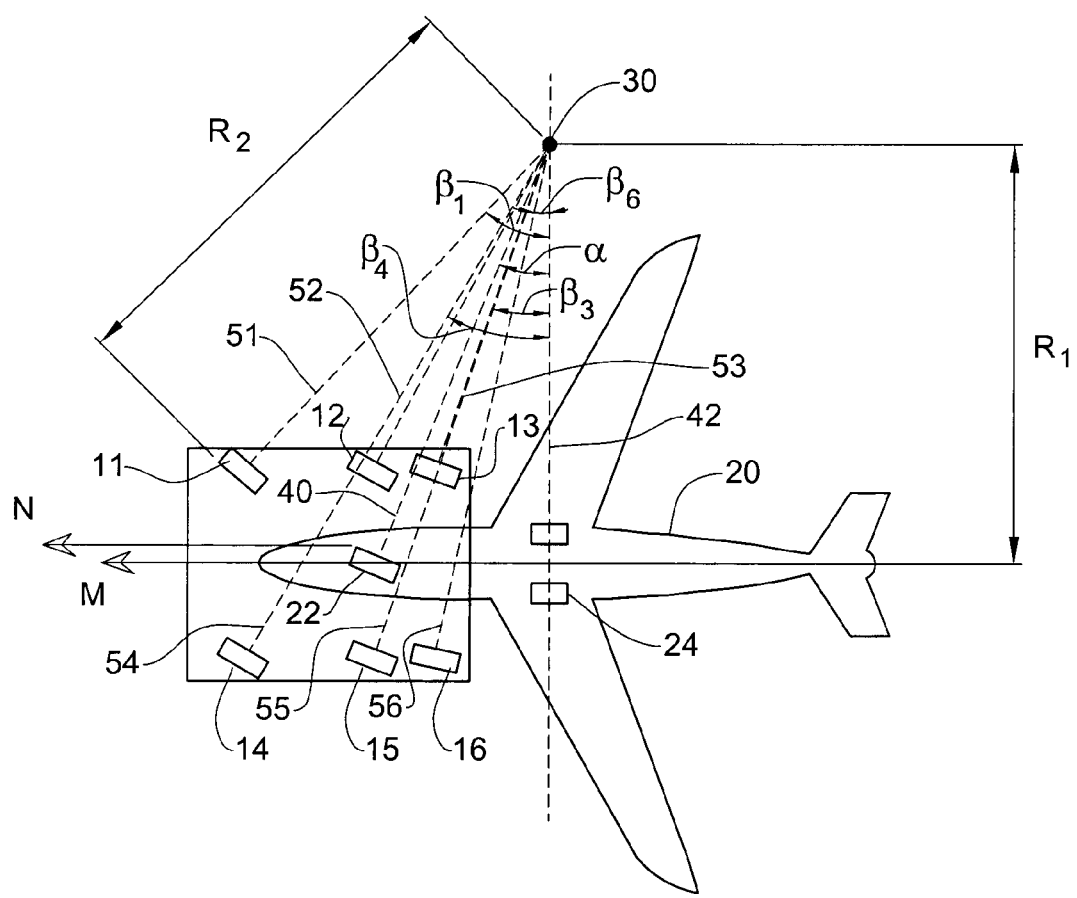
FIG. 2 is a schematic illustrated of the vehicle and airplane illustrated in FIG. 1, demonstrating a parallel disposition between the airplane and the vehicle while turning, while an Ackermann steering geometry is applied.

FIG. 2 shows another example, in which the airplane 20 is steered by the pilot to be town along a curved path, and particularly to turn about an airplane pivot point 30. In this example, the controller maintains the in-phase position of the vehicle with respect to the airplane 20, such that the vehicle longitudinal axis N is substantially always parallel to the airplane longitudinal axis M, so called Ackerman steering. If these axes are not parallel to each other, for example, during the turn, the controller's goal is to correct the deviation, so as to bring the vehicle 10 to the in-phase position with the airplane 20. This correction may be performed in real time, i.e., as soon as such a deviation occurs or as soon as it reaches a predetermined threshold (e.g., a predetermined deviation angle). In order to identify deviations, a sensor (not illustrated) can be provided with the vehicle to detect the relative angle between the two longitudinal axes M and N, and to be in communication with the controller to provide a signal indicative of this information. The sensor is configured for sensing at least indirectly the deviation, and generating the signal to the controller. This sensor can also detect, at least indirectly, a deviation angle μ (shown, for example, in FIGS. 4a-b and 5a-b) formed between the vehicle longitudinal axis N and the airplane longitudinal axis M, and generating a signal to the controller indicative of this deviation angle.

Reference is now made to FIG. 2, in which shown the front airplane wheels 22 of the airplane 20, being rotated by pilot command with respect to the airplane longitudinal axis M. In this position, the pilot desires to rotate the airplane 20 about the airplane pivot point 30. The front airplane wheels 22 (nose landing gear) of the airplane 20 (which are parallel to each other) have a first axis of rotation 40. The airplane further comprises two main landing gears wheels 24, with a common second axis of rotation 42. When the pilot rotates the front airplane wheels 22, the first and the second axes of rotation 40 and 42 intersect in the common airplane pivot point 30 about which the airplane 20 supposed to turn, such that an angle α is formed between these axes, also the angle between the airplane nose landing gear and the airplane longitudinal axis M, the pilot demanded steering command. In ideal conditions (e.g., when there is no deviation between the vehicle 10 and the airplane 20), the airplane 20 will turn about airplane pivot point 30 at a radius R1 which is the distance between the airplane pivot point 30 and the airplane longitudinal axis M, and the vehicle 10 will turn about the airplane pivot point 30 at a radius R2 which is the distance between the airplane pivot point 30 and a pivot axis of the airplane's nose landing gear.

Each of the vehicle wheels 11-16, illustrated in FIG. 2, has a respectful vehicle wheel axis of rotation 51-56, which is perpendicular to each wheel. In order to maintain the in-phase position between the vehicle 10 and the airplane 20, the controller is configured to control each vehicle wheel 11-16 to be turned at its Ackerman angle with respect to the second axis of rotation 42, such that all vehicle wheel axes intersect at the airplane pivot point 30. The location of airplane pivot point 30 is calculated by the controller according to angle α. The Ackerman angles of each vehicle wheel 11-16, which are marked as $\beta_1$-$\beta_6$, are defined as the angle between each vehicle wheel axis of rotation 51-56 and the second axis of rotation 42. The angles $\beta_1$-$\beta_6$ are calculated by the controller according to the geometry of the vehicle 10 and the airplane 20, vehicle and airplane wheel base geometry and according to the location of airplane pivot point 30 with respect to the airplane 20. The calculation of the Ackerman angles $\beta_1$-$\beta_6$ can be easily performed according to an Ackermann steering geometry, and is obvious to a person skilled in the art. The theory on which based the Ackermann steering geometry, which is implemented by the controller in this case, refers to position of the wheels which gives rise to Ackermann steering (i.e., wherein the center points of all of the circles traced by all wheels will lie at a common point), and is not limited to any particular mechanism. According to this geometry, the centers of the turning circles for all of the wheels lie on a single point, which is typically the airplane instantaneous center of turning intersect with the axel direction of the wheels of the main landing gear. In order to achieve this, the axes of rotation of all of the wheels (i.e., the axes about which the wheels spin, which lie along the axel directions of the wheels) must intersect at a single intersection point (e.g., airplane pivot point 30). In a case, for example, wherein the vehicle 10 is designed according to the disclosure of WO 2008/038270, which is incorporated herein by reference, such that the vehicle's operation vis-à-vis turning is directed by the rotation of the nose landing gear of the airplane, the controller may be configured to maintain the nose landing gear in conformation with the Ackermann steering geometry.

Figure 3:
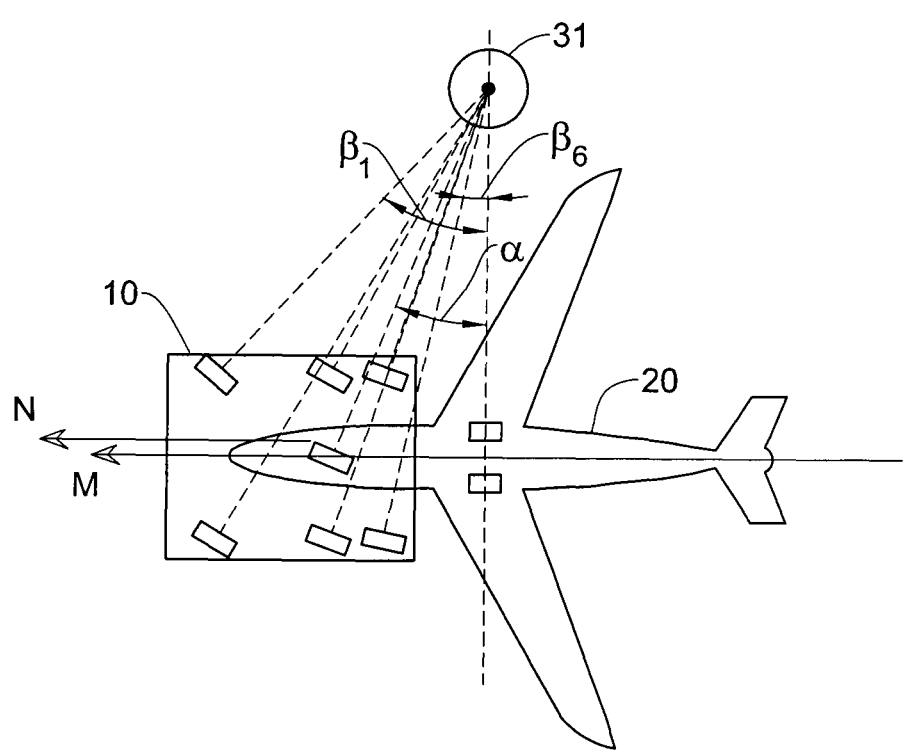
FIG. 3 illustrates a maximum deviation of intersection point of the axes of rotation of the wheels of the vehicle from the desired airplane pivot point of turning of the airplane.

Reference is now made to FIG. 3, illustrating an alternative example, in which a maximum deviation from the airplane pivot point 30 may be predefined due to deviation of the parallel between N and M. This maximum deviation is illustrated by circle 31. The controller is designed to ensure that the intersection point of the wheel axes of rotation 51-56 is always within the circle 31. In this way, a tolerance is defined wherein the vehicle 10 and airplane 20 can be considered to be in parallel disposition with one another.

As mentioned above, it is within the scope of the presently disclosed subject matter to disclose different techniques in order to correct the deviation between the vehicle longitudinal axis N and airplane longitudinal axis M, when the vehicle 10 is in the out-phase position with respect to the airplane 20.

In order to provide this correction, the controller is configured to receive a signal indicative of an out-phase position of the vehicle 10 relative to the airplane 20, in which there is deviation from the parallel disposition of the vehicle longitudinal axis N with respect to the airplane longitudinal axis M, and to correct, in response to said signal, the deviation by turning at least part of the vehicle wheels 11-16 so as to return the vehicle to the in-phase position. This turning of the wheels results in an out-phase steering which lasts until the deviation is corrected.

Figure 4A:
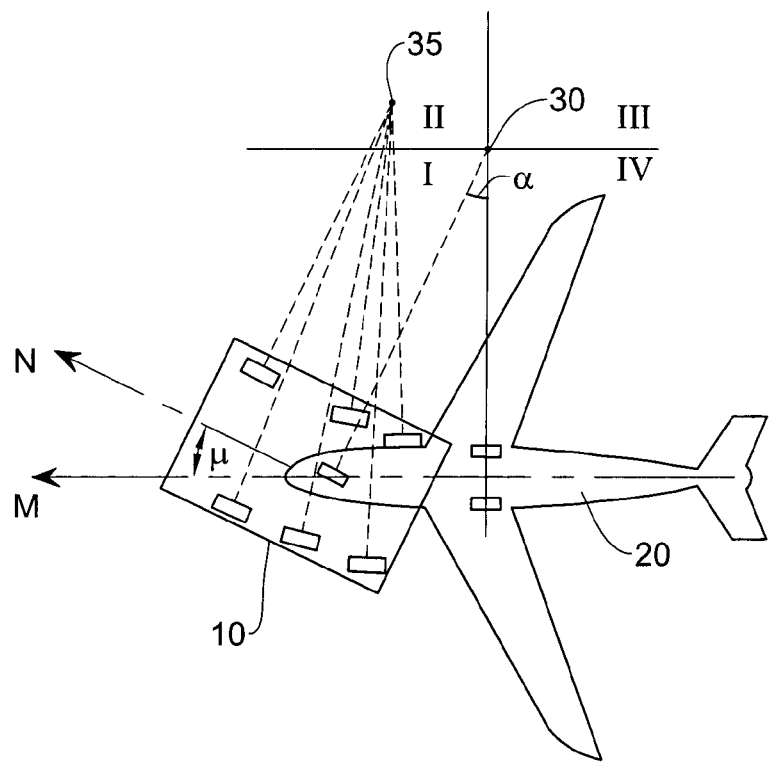
FIGS. 4a and 4b illustrate one example of a technique for correcting the deviation between the vehicle and airplane while in turn.
Figure 4B:
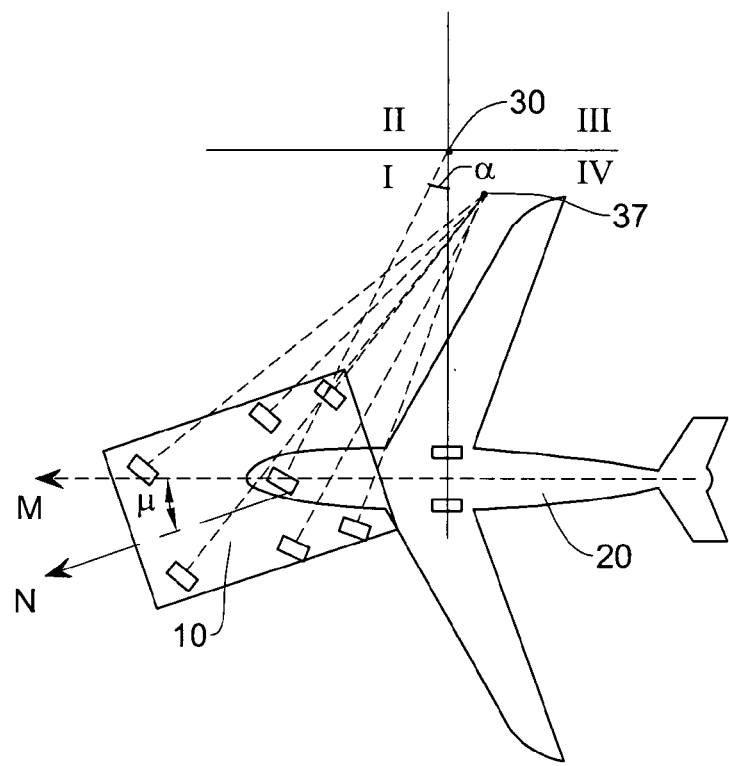

Reference is now made to FIGS. 4a and 4b, which illustrate one example of a technique according to which the out-phase position can be corrected to the in-phase position. According to this technique, the controller is configured to operate all the vehicle wheels such that their wheel axes 51-56 intersect at an intermediate point 35 (in FIG. 4a) or 37 (in FIG. 4b) which is different from the airplane pivot point 30. This operation of the controller will result in convergence of the airplane pivot point 30 with the intermediate point and disappearance of the deviation, such that parallel disposition between the vehicle 10 and the airplane 20 is regained. When this happens, the controller can turn all the vehicle wheels to their Ackerman angles (according to the angle α) towards airplane pivot point 30 for maintaining the in-phase position of the vehicle with the airplane.

As illustrated in FIGS. 4a and 4b, point 35 or 37 can lie at an intersection point of four quadrants I, II, III, IV. Quadrants I and II and separated from quadrants III and IV by the axel direction of the wheels of the main landing gear 22, and quadrants I and IV and separated from quadrants II and III by a line (not designated) passing perpendicularly through the axel direction of the wheels of the main landing gear at point 24. Quadrants I and IV are closer to the airplane 12 than are quadrants II and III, and quadrants I and II face the fore of the airplane while quadrants III and IV face the aft thereof.

As shown in FIG. 4a, when the deviation from the parallel disposition of the vehicle longitudinal axis N relative to the airplane longitudinal axis M is such that the vehicle longitudinal axis N is diverted towards the airplane pivot point 30, the intermediate point 35 is chosen to be located farther from the airplane longitudinal axis M than the airplane pivot point 30. In other words, the location of the intermediate point 35 can be in quarter II or in quarter III which are shown in FIG. 4a.

As shown in FIG. 4b, when the deviation from the parallel disposition of the vehicle longitudinal axis N relative to the airplane longitudinal axis M is such that the vehicle longitudinal axis N is diverted away from the airplane pivot point 30, the intermediate point 37 is located closer to the airplane longitudinal axis M than the airplane pivot point 30. In other words, the location of the intermediate point 37 can be in quarter I or in quarter IV which are shown in FIG. 4b.

Figure 5A:
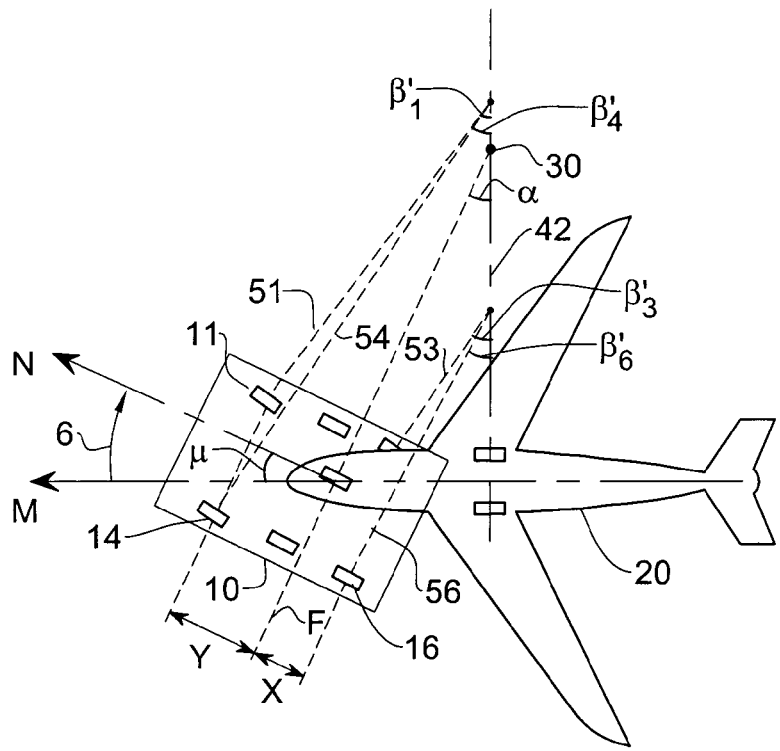
FIGS. 5a and 5b illustrate another example of a technique for correcting the deviation between the vehicle and airplane while in turn.
Figure 5B:
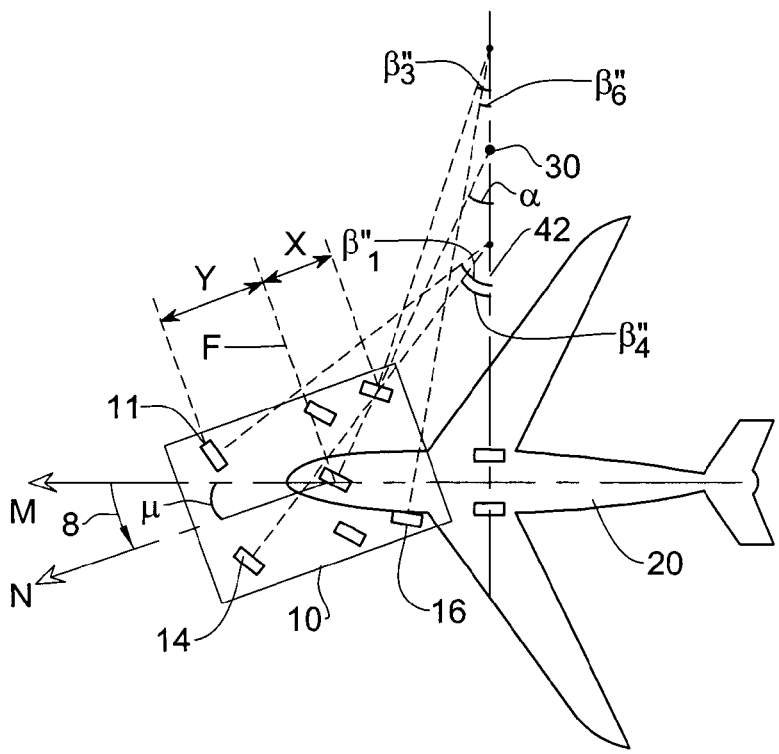

Reference is now made to FIGS. 5a and 5b, which illustrate another example of a technique according to which the out-phase position can be corrected to the in-phase position. According to this technique, the controller is configured to operate the front vehicle wheels 11 and 14 to be turned to one direction from their Ackerman angles, and the rear vehicle wheels 13 and 16 to be turned to another, opposite direction from the their Ackerman angles. This turning of the front and the rear wheels is configured to cause the vehicle 10 to perform yawing of with respect to a longitudinal axis of the nose landing gear being received upon the vehicle, and to bring the vehicle from the out-phase position with the airplane to the in-phase position there between.

As shown in FIG. 5a, when the deviation from the parallel disposition of the vehicle longitudinal axis N relative to the airplane longitudinal axis M is such that the vehicle longitudinal axis N is diverted towards the airplane pivot point 30, the controller is configured to correct the deviation by turning the front wheels towards the airplane longitudinal axis (opposite to a direction of the deviation, indicated as an arrow 6), and by turning the rear wheels away from the airplane longitudinal axis (towards the direction of arrow 6).

According to this example, the front wheels 11 and 14 and the rear wheel 13 and 16 are turned by the controller, such that new angles between the front and the rear wheel axes with the second axis of rotation 42 are provided, in the following manner:

The angle $\beta_1'$ between the front wheel axis 51 and the second axis of rotation 42 is a subtraction of a correction angle $\beta_c$ from the Ackerman angle $\beta_3$, i.e., $\beta_1'=\beta_1-\beta_c$;

The angle $\beta_4'$ between the front wheel axis 54 and the second axis of rotation 42 is a subtraction of a correction angle $\beta_c$ from the Ackerman angle $\beta_3$, i.e., $\beta_4'=\beta_4-\beta_c$;

The angle $\beta_3'$ between the rear wheel axis 53 and the second axis of rotation 42 is a sum the Ackerman angle $\beta_3$ (from FIG. 2) and the of a correction angle $\beta_c$ which is multiplied by a wheel base ration $\lambda$, i.e., $\beta_3'=\beta_3+\lambda*\beta_c$;

The angle $\beta_6'$ between the rear wheel axis 56 and the second axis of rotation 42 is a sum the Ackerman angle $\beta_6$ (from FIG. 2) and the of a correction angle $\beta_c$ which is multiplied by a wheel base ration $\lambda$, i.e., $\beta_6'=\beta_6+\lambda*\beta_c$;

According to different in the present application, the wheel base ration $\lambda$ is given by the formula: $\lambda=Y/X$, when Y is the longitudinal distance (i.e., along the vehicle longitudinal axis N) between the axis which connects the front wheels 11 and 14 on the one hand, and an axis F which is perpendicular to N and passes through the nose landing gear of the airplane on the other hand; and X is the longitudinal distance between the axis which connects the rear wheels 13 and 16 on the one hand, and the axis F on the other hand.

As shown in FIG. 5b, when the deviation from the parallel disposition of the vehicle longitudinal axis N relative to the airplane longitudinal axis M is such that the vehicle longitudinal axis N is diverted away from the airplane pivot point 30, the controller is configured to correct the deviation by turning the front wheels away from the airplane longitudinal axis M (opposite to a direction of the deviation, indicated as an arrow 8), and by turning the rear wheels towards the airplane longitudinal axis M (towards the direction of arrow 8).

According to this example, the front wheels 11 and 14 and the rear wheel 13 and 16 are turned by the controller, such that new angles between the front and the rear wheel axes with the second axis of rotation 42 are provided, in the following manner:

The angle $\beta_1''$ between the front wheel axis 51 and the second axis of rotation 42 is a sum of the Ackerman angle $\beta_1$ (from FIG. 2) and a correction angle $\beta_c$, i.e., $\beta_1''=\beta_1+\beta_c$;

The angle $\beta_4''$ between the front wheel axis 54 and the second axis of rotation 42 is a sum of the Ackerman angle $\beta_4$ (from FIG. 2) and a correction angle $\beta_c$, i.e., $\beta_4''=\beta_4+\beta_c$;

The angle $\beta_3''$ between the rear wheel axis 53 and the second axis of rotation 42 is a subtraction of a correction angle $\beta_c$ which is multiplied by a wheel base ration $\lambda$ from the Ackerman angle $\beta_3$ (from FIG. 2), i.e., $\beta_3'=\beta_3-\lambda*\beta_c$;

The angle $\beta_6''$ between the rear wheel axis 56 and the second axis of rotation 42 is a subtraction of a correction angle $\beta_c$ which is multiplied by a wheel base ration $\lambda$ from the Ackerman angle $\beta_6$ (from FIG. 2), i.e., $\beta_6''=\beta_6-\lambda*\beta_c$;

According to one example, the correction angle $\beta_c$ is proportional to a deviation angle $\mu$ (shown in FIGS. 5a and 5b) formed between the vehicle longitudinal axis N and the airplane longitudinal axis M, such that its formula is:

$\beta_c=\mu*\kappa$, when $\kappa$ is a constant which can be determined by experimental results and analysis thereof, and/or computational simulations. The value of $\kappa$ is mainly defined by how "fast" one wants to correct the deviation from the in-phase position, for returning the vehicle and the airplane thereto.

In order to implement the above, the controller needs to be updated with information regarding the vehicle wheel base geometry (wheels distance from the center) and the airplane wheel base (distance between the wheels of the nose landing gear and wheels of the main landing gears) and the angle $\alpha$. All other information it requires is independent of the type and geometry of airplane being towed.

Maintaining a parallel disposition between the vehicle 10 and the airplane 20 has several advantages. For example, if the vehicle 10 is forced to come to a complete stop in the middle of a turn, or the airplane 20 has to move at low speed, it is easier to resume operation if it is parallel to the airplane than if it is not; such a resuming does not entail pilot induced oscillations, on one hand. In addition, operation as described above mitigates or eliminates the risk of jackknifing (inadvertent vehicle yaw) between the vehicle 10 and airplane 20 during high speed taxing operation, on the other hand.

Those skilled in the art to which this invention pertains will readily appreciate that numerous changes, variations and modifications can be made to features of the presently disclosed subject matter, described above. For example, the vehicle 10 may comprise any number of wheels. In addition, the controller may be configured so as to conform only some of the wheels of the vehicle 10 to an Ackermann steering geometry (this may be especially relevant for the pair of wheels along whose axis the nose landing gear lies).

The invention claimed is:

1. A vehicle for towing an airplane by receiving thereupon a nose landing gear of the airplane having an airplane longitudinal axis, said nose landing gear of the airplane having at least one front airplane wheel with a first axis of rotation, said airplane having main landing gear wheels with a common second axis of rotation such that, the first and the second axes of rotation intersect in a common airplane pivot point about which the airplane is to turn, said vehicle having a vehicle longitudinal axis and being configured to tow said airplane along a substantially straight or curved path, said vehicle comprising:
   a controller for directing operation of the vehicle, including maintaining the vehicle's in-phase position in which said vehicle longitudinal axis is substantially parallel to said airplane longitudinal axis;
   a plurality of vehicle wheels, each having a vehicle wheel axis of rotation; and
   wherein the controller is configured to calculate the location of the pivot point of the airplane according to a steering angle between the first and the second axes of rotation, and to control each vehicle wheel to be turned at its Ackerman angle, which is calculated by the controller according to the steering angle, with respect to the second axis of rotation such that all vehicle wheel axes intersect at the pivot point, whereby said in-phase position is maintained.

2. The vehicle according to claim 1, wherein said airplane is configured for turning about an airplane pivot point which lies on an axis of its main landing gear wheels; and wherein said vehicle comprises a plurality of wheels each configured for rolling about an axis of rotation, said controller being configured to direct all wheels, during turning of the vehicle, to maintain their axes of rotation so as to intersect at said airplane pivot point.

3. The vehicle according to claim 2, wherein the airplane is configured to receive from an operator thereof a steering command resulting in turning at least one front airplane wheel of the nose landing gear relative to the airplane longitudinal axis, and wherein said controller is configured to receive a first signal indicative of indicative of an angle to which said at least one front airplane wheel is turned relative to said airplane longitudinal axis, for calculating the location of the airplane pivot point, and a second signal indicative of an angle between the vehicle and the airplane longitudinal axes, and said controller is configured to direct operation of the vehicle so as to turn the vehicle about the airplane pivot point, thereby causing said vehicle be in the in-phase position with the airplane.

4. The vehicle according to claim 1, wherein said controller is configured to receive a signal indicative of an out-phase position of the vehicle relative to the airplane, in which there is deviation from the substantially parallel disposition of the vehicle longitudinal axis with respect to the airplane longitudinal axis, and to correct, in response to said signal, the deviation by turning at least part of the vehicle wheels so as to return the vehicle to said in-phase position.

5. The vehicle according to claim 4, wherein the controller is configured to operate all the vehicle wheels such that their wheel axes intersect at an intermediate point that is different from the pivot point, and, only when said deviation disappears, and to turn all the vehicle wheels to their Ackerman angles for maintaining the in-phase position of the vehicle.

6. The vehicle according to claim 5, wherein when the deviation from the substantially parallel disposition of the vehicle longitudinal axis relative to the airplane longitudinal axis is such that the vehicle longitudinal axis is diverted towards the pivot point, the intermediate point being located farther from the airplane longitudinal axis than the pivot point.

7. The vehicle according to claim 5, wherein when the deviation from the substantially parallel disposition of the vehicle longitudinal axis relative to the airplane longitudinal axis is such that the vehicle longitudinal axis is diverted away from the pivot point, the intermediate point is located closer to the airplane longitudinal axis than the pivot point.

8. The vehicle according to claim 5, wherein said vehicle wheels comprise front and rear wheels, and the controller is configured to operate the front wheels to be turned in one direction from their Ackerman angle, and to operate the rear wheels to be turned in another, opposite direction from their Ackerman angle, to yaw the vehicle until brought to the in-phase position with the airplane.

9. The vehicle according to claim 5, wherein when the deviation from the substantially parallel disposition of the vehicle longitudinal axis relative to the airplane longitudinal axis is such that the vehicle longitudinal axis is diverted away from the pivot point, the controller is configured to correct the deviation by turning the front wheels towards the airplane longitudinal axis, and by turning the rear wheels away from the airplane longitudinal axis.

10. The vehicle according to claim 9, wherein the turning of the front wheels towards the airplane longitudinal axis is provided such that the angle between the axis of each front wheel and the second axis of rotation is a sum of the Ackerman angle of each wheel and a correction angle; and wherein the turning of the rear wheels away from the airplane longitudinal axis is provided such that the angle between the axis of each rear wheel and the second axis of rotation is a subtraction of a correction angle which is multiplied by a wheel base ration $\lambda$ from the Ackerman angle of each wheel, when $\lambda$ is associated with the location of the nose landing gear on the vehicle and the distance of the vehicle wheels therefrom.

11. The vehicle according to claim 5, wherein when the deviation from the substantially parallel disposition of the vehicle longitudinal axis relative to that of the airplane is such that the vehicle longitudinal axis is diverted towards the pivot point, the controller is configured to correct the deviation by turning the front wheels away from the airplane longitudinal axis, and by turning the rear wheels towards the airplane longitudinal axis.

12. The vehicle according to claim 11, wherein the turning of the front wheels away from the airplane longitudinal axis is provided such that the angle between the axis of each front wheel and the second axis of rotation is a subtraction of a correction angle from the Ackerman angle of each wheel; and wherein the turning of the rear wheels towards the airplane longitudinal axis is provided such that the angle between the axis of each rear wheel and the second axis of rotation is a sum of the Ackerman angle of each wheel and a correction angle which is multiplied by a wheel base ration $\lambda$ that is associated with the location of the nose landing gear on the vehicle.

13. A method for directing operation of a vehicle configured to tow an airplane by receiving thereupon a nose landing gear of the airplane having an airplane longitudinal axis, said nose landing gear of the airplane having at least one front airplane wheel with a first axis of rotation, said airplane having main landing gear wheels with a common second axis of rotation such that, the first and the second axes of rotation intersect in a common airplane pivot point about which the airplane is to turn, said vehicle having a vehicle longitudinal axis and being configured to tow said airplane along a substantially straight or curved path and comprising a controller, said vehicle comprises a plurality of vehicle wheels, each having a vehicle wheel axis of rotation, said method comprising:

directing the operation of the vehicle;
   maintaining the vehicle's in-phase position in which said vehicle longitudinal axis is substantially parallel to said airplane longitudinal axis; and
   calculating, via said controller, the location of the pivot point of the airplane according to a steering angle between the first and the second axes of rotation, and controlling, each vehicle wheel to be turned at its Ackerman angle, which is calculated by the controller according to the steering angle, with respect to the second axis of rotation such that all vehicle wheel axes intersect at the pivot point, thereby maintaining said in-phase position of the vehicle.

14. The method according to claim 13, wherein said vehicle comprises a controller and a plurality of wheels each configured for rolling about an axis of rotation, said method further comprising:

turning the airplane about an airplane pivot point which lies on an axis of its main landing gear wheels;
   turning the vehicle; and
   directing, via said controller, all the wheels of the vehicle, during turning of the vehicle, to maintain their axes of rotation so as to intersect at said airplane pivot point.

15. The method according to claim 13, further comprising receiving, by said controller, a first signal indicative of an angle between at least one front airplane wheel of the nose landing gear and the airplane longitudinal axis, indicative of a steering command of the airplane for calculating the location of the airplane pivot point, and a second signal indicative of an angle between the vehicle and airplane longitudinal axes and directing, via said controller, the operation of the vehicle so as to turn about the airplane pivot point, thereby causing said vehicle be in the in-phase position with the airplane.

16. The method according to claim 15, further comprising receiving, by said controller, signal indicative of an out-phase position of the vehicle relative to the airplane, in which there is deviation from the substantially parallel disposition of the vehicle longitudinal axis with respect to the airplane longitudinal axis, and correcting, by said controller, in response to said signal, the deviation by turning at least part of the vehicle wheels so as to return the vehicle to said in-phase position.

17. The method according to claim 16, further comprising operating all the vehicle wheels to be turned such that their wheel axes intersect at an intermediate point which is different from the pivot point, and, only when said deviation disappears, turning all the vehicle wheels to their Ackerman angles for maintaining the in-phase position of the vehicle.

18. The method according to claim 17, wherein when the deviation from the substantially parallel disposition of the vehicle longitudinal axis relative to the airplane longitudinal axis is such that the vehicle longitudinal axis is diverted towards the pivot point, the intermediate point being located farther from the airplane longitudinal axis than the pivot point.

19. The method according to claim 17, wherein when the deviation from the substantially parallel disposition of the vehicle longitudinal axis relative to the airplane longitudinal axis is such that the vehicle longitudinal axis is diverted away from the pivot point, the intermediate point is located closer to the airplane longitudinal axis than the pivot point.

20. A system including an airplane having a longitudinal axis and a vehicle according to claim 1 for towing the airplane.

* * * * *